(12) United States Patent
Komatsu et al.

(10) Patent No.: US 9,956,960 B2
(45) Date of Patent: May 1, 2018

(54) CONTROL DEVICE FOR VEHICLE AND CONTROL METHOD FOR VEHICLE

(71) Applicant: NISSAN MOTOR CO., LTD., Yokohama-shi, Kanagawa (JP)

(72) Inventors: Hiroyuki Komatsu, Kanagawa (JP); Ken Ito, Kanagawa (JP); Takashi Nakajima, Kanagawa (JP); Yuji Katsumata, Kanagawa (JP); Akira Sawada, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days. days.

(21) Appl. No.: 15/545,785

(22) PCT Filed: Jan. 26, 2015

(86) PCT No.: PCT/JP2015/052083
§ 371 (c)(1),
(2) Date: Jul. 24, 2017

(87) PCT Pub. No.: WO2016/120980
PCT Pub. Date: Aug. 4, 2016

(65) Prior Publication Data
US 2018/0015925 A1    Jan. 18, 2018

(51) Int. Cl.
*B60W 30/18*    (2012.01)
*B60W 10/08*    (2006.01)
(Continued)

(52) U.S. Cl.
CPC ......... *B60W 30/18127* (2013.01); *B60L 7/10* (2013.01); *B60W 10/08* (2013.01);
(Continued)

(58) Field of Classification Search
CPC ......... B60W 30/18127; B60W 40/105; B60W 10/184; B60W 10/08; B60W 2550/142;
(Continued)

(56) References Cited

U.S. PATENT DOCUMENTS 8,751,125 B2    6/2014    Ozaki
2005/0017580 A1    1/2005    Cikanek et al.
(Continued)

FOREIGN PATENT DOCUMENTS

JP    8-79907 A    3/1996
JP    2002-178895 A    6/2002
(Continued)

*Primary Examiner* — Yuen H Wong
(74) *Attorney, Agent, or Firm* — Foley & Lardner LLP

(57) ABSTRACT

The device that generates the friction braking force to decelerate the vehicle estimates the disturbance torque acting on the vehicle. When the accelerator operation amount is equal to or less than the predetermined value and the vehicle is just before the stop of the vehicle, the control device for vehicle causes the friction braking amount to converge to the friction braking amount to the value decided on the basis of the disturbance torque estimated value Td in conjunction with the reduction in the motor rotation speed (speed parameter) proportionate to the traveling speed of the vehicle.

10 Claims, 10 Drawing Sheets

(51) Int. Cl.
*B60W 10/184* (2012.01)
*B60W 40/105* (2012.01)
*B60L 7/10* (2006.01)

(52) U.S. Cl.
CPC ........ *B60W 10/184* (2013.01); *B60W 40/105* (2013.01); *B60W 2510/081* (2013.01); *B60W 2510/083* (2013.01); *B60W 2520/10* (2013.01); *B60W 2540/10* (2013.01); *B60W 2550/142* (2013.01); *B60W 2710/18* (2013.01)

(58) Field of Classification Search
CPC ....... B60W 2510/083; B60W 2540/10; B60W 2520/10; B60W 2510/081; B60W 2710/18; B60L 7/10
See application file for complete search history.

(56) References Cited

U.S. PATENT DOCUMENTS

2005/0187671 A1\* 8/2005 Nada ...................... B60K 6/365
701/1
2011/0066342 A1 3/2011 Ozaki

FOREIGN PATENT DOCUMENTS

| JP | 2003-341496 A | 12/2003 |
| JP | 2007-126057 A | 5/2007 |
| JP | 2011-63122 A | 3/2011 |

\* cited by examiner

CONTROL DEVICE FOR VEHICLE AND CONTROL METHOD FOR VEHICLE

TECHNICAL FIELD

The present invention relates to a control device for vehicle and a control method for vehicle.

BACKGROUND ART

Conventionally, a regenerative brake control device for electric vehicles provided with setting means capable of any given setting of a regenerative braking force of a motor and regenerates the motor by the regenerative braking force set by the setting means is known (see JP8-79907A).

SUMMARY OF INVENTION

However, if the regenerative braking force set by the setting means is large, the following problem occurs. A vibration in a longitudinal direction of a vehicle body may be generated when the electric vehicle is decelerated by the set regenerative braking force and the speed becomes 0.

An object of the present invention is to provide a technique that reduces the generation of vibration in a longitudinal direction of a vehicle body in stopping a vehicle.

A control device for vehicle according to an embodiment is that a control device for vehicle of the one embodiment is the device that generates the friction braking force to decelerate the vehicle. The control device for vehicle is includes a speed parameter detecting means configured to detect a speed parameter proportionate to a traveling speed of the vehicle, an accelerator operation amount detecting means configured to detect an accelerator operation amount, a disturbance torque estimating means configured to estimate a disturbance torque acting on the vehicle, and a friction-braking-amount adjusting means configured to electrically adjust a friction braking amount. Further, the control device for vehicle includes a control means configured such that the control means causes the friction braking amount to converge to a value decided on the basis of the disturbance torque in conjunction with a reduction in the speed parameter when the accelerator operation amount is equal to or less than a predetermined value and the vehicle is just before a stop of the vehicle.

Embodiments of the present invention and merits of the present invention will be described below in detail together with the attached drawings.

DESCRIPTION OF EMBODIMENTS

The following describes an example that applies a control device for vehicle according to the present invention to an electric vehicle.

Figure 1:
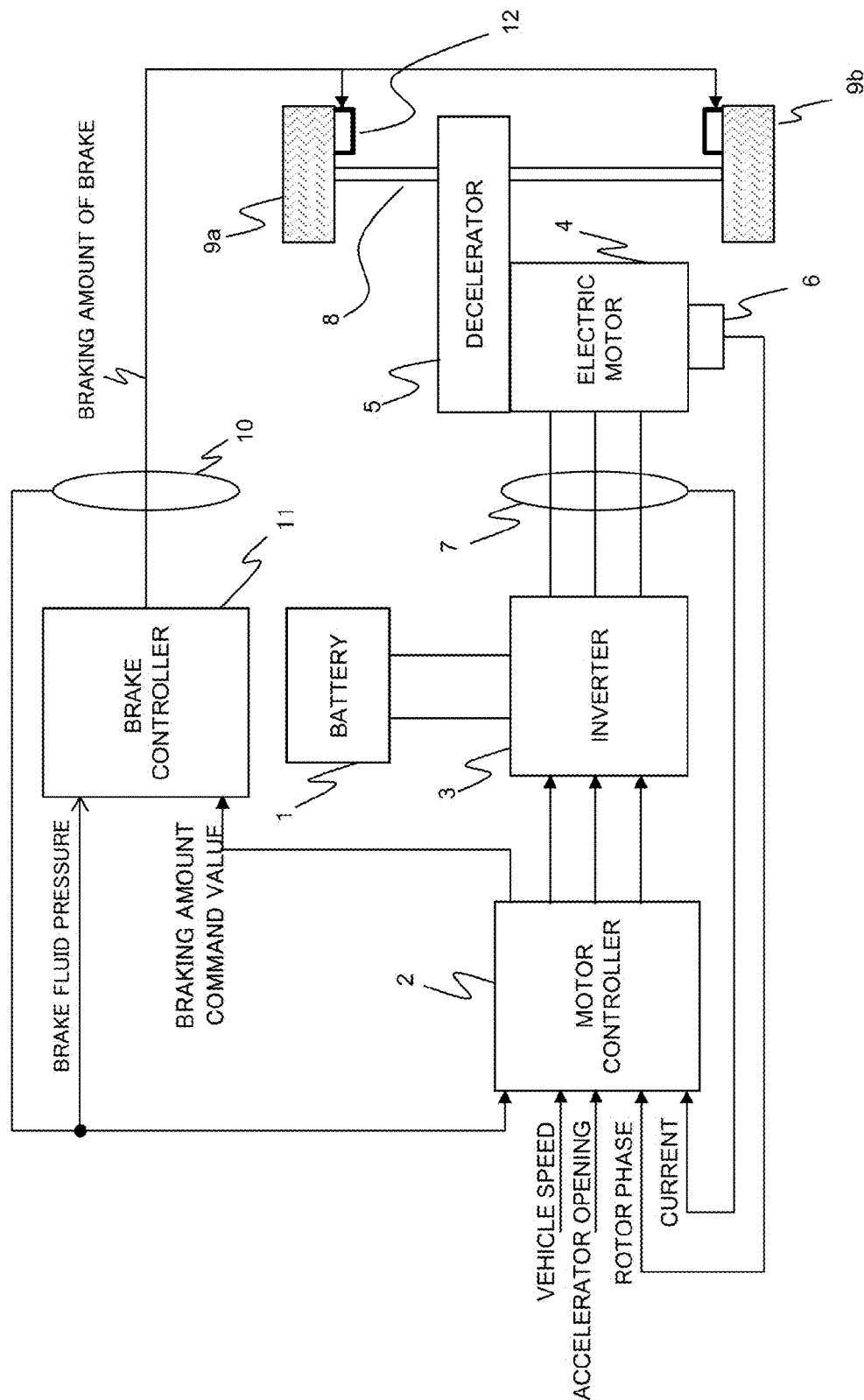
FIG. 1 is a block diagram illustrating a main configuration of an electric vehicle with a control device for vehicle according to one embodiment.

FIG. 1 is a block diagram illustrating a main configuration of the electric vehicle with a control device for vehicle according to one embodiment. Particularly, the control device for vehicle according to the embodiment can be applied to a vehicle capable of controlling acceleration/deceleration and a stop of the vehicle only by an operation of an accelerator pedal. In this vehicle, a driver depresses the accelerator pedal during acceleration and reduces or zeros a depression amount of the depressed accelerator pedal during deceleration or during stop. It should be noted that, the vehicle approaches the stop state while the driver depresses the accelerator pedal to prevent the vehicle from retreating on uphill roads in some cases. When the vehicle approaches the stop state by the accelerator pedal operation by the driver, a brake controller, which will be described later, actuates a friction brake to decelerate or stop the vehicle. That is, the control device for vehicle of the embodiment can electrically adjust a braking amount of the friction brake regardless of the brake pedal operation by the driver.

A motor controller 2 has signals indicating vehicle states such as a vehicle speed V, an accelerator position AP, a rotator phase α of a motor (three-phase alternating current motor) 4 and currents iu, iv, and iw of the motor 4, which are input to the motor controller 2 in the form of digital signals, and generates PWM signals for controlling the motor 4 on the basis of the input signals. The motor controller 2 generates a drive signal of an inverter 3 by the generated PWM signal. The motor controller 2 further generates a friction-braking-amount command value by a method described later.

The inverter 3 includes, for example, two switching elements (e.g. power semiconductor elements such as IGBTs or MOS-FETs) for each phase, converts a direct current supplied from a battery 1 into an alternating current by turning on and off the switching elements in accordance with the drive signal and causes a desired current to flow into the motor 4.

The motor 4 generates a drive force by the alternating current supplied from the inverter 3 and transmits the drive force to right and left drive wheels 9a and 9b via a speed reducer 5 and a drive shaft 8. Further, when being rotated following the rotation of the drive wheels 9a and 9b during the travel of the vehicle, the motor 4 generates a regenerative drive force, thereby collecting the kinetic energy of the vehicle as electrical energy. In this case, the inverter 3 converts an alternating current generated during the regenerative operation of the motor 4 into a direct current and supplies the direct current to the battery 1.

A current sensor 7 detects the three-phase alternating currents iu, iv and iw flowing in the motor 4. Note that, since the sum of the three-phase alternating currents iu, iv and iw is 0, the currents of any of two phases may be detected and the current of the remaining one phase may be obtained by calculation.

A rotation sensor 6 is, for example, a resolver or an encoder and detects the rotator phase α of the motor 4.

A fluid pressure sensor 10 detects a brake fluid pressure.

A brake controller 11 generates the brake fluid pressure according to the friction-braking-amount command value, which is generated by the motor controller 2. The brake controller 11 performs a feedback control such that the brake fluid pressure detected by the fluid pressure sensor 10 follows a value decided according to the friction-braking-amount command value.

Friction brakes 12 are disposed at the right and left drive wheels 9a and 9b. The friction brake 12 presses a brake pad to a brake rotor according to the brake fluid pressure to generate a braking force to the vehicle.

Figure 2:
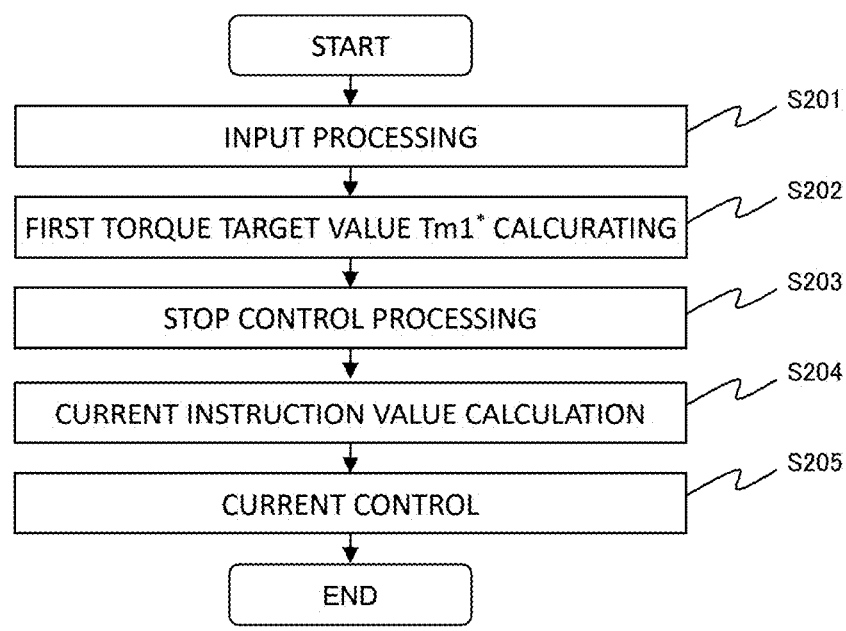
FIG. 2 is a flowchart showing a flow of processes for a motor current control performed by a motor controller.

FIG. 2 is a flowchart showing a flow of processes for a motor current control performed by the motor controller 2.

In Step S201, signals indicating the vehicle states are input. Here, the vehicle speed V (km/h), the accelerator position AP (%), the rotator phase α (rad) of the motor 4, a rotation speed Nm (rpm) of the motor 4, the three-phase alternating currents iu, iv and iw flowing in the motor 4, a direct-current voltage value Vdc (V) between the battery 1 and the inverter 3, and the brake fluid pressure are input.

The vehicle speed V (km/h) is obtained by a vehicle speed sensor or through communications from another controller (not illustrated). Alternatively, a vehicle speed v (m/s) is obtained by multiplying a rotator mechanical angular velocity ωm by a tire dynamic radius R and dividing the product by a gear ratio of a final gear, and then the obtained value is multiplied by 3600/1000 for unit conversion, thereby obtaining the vehicle speed V (km/h).

The accelerator position AP (%) is obtained from an accelerator position sensor (not illustrated) or through communications from another controller such as a vehicle controller (not illustrated).

The rotator phase α (rad) of the motor 4 is obtained from the rotation sensor 6. The rotation speed Nm (rpm) of the motor 4 is obtained by dividing a rotator angular velocity ω (electric angle) by a pole pair number p of the motor 4 to obtain a motor rotation speed ωm (rad/s), which is a mechanical angular velocity of the motor 4, and multiplying the obtained motor rotation speed ωm by 60/(2π). The rotator angular velocity ω is obtained by differentiating the rotator phase α.

The currents iu, iv and iw (A) flowing in the motor 4 are obtained from the current sensor 7.

The direct-current voltage value Vdc (V) is obtained from a voltage sensor (not illustrated) provided in a direct-current power supply line between the battery 1 and the inverter 3 or a power supply voltage value transmitted from a battery controller (not illustrated).

The fluid pressure sensor 10 detects the brake fluid pressure.

Figure 3:
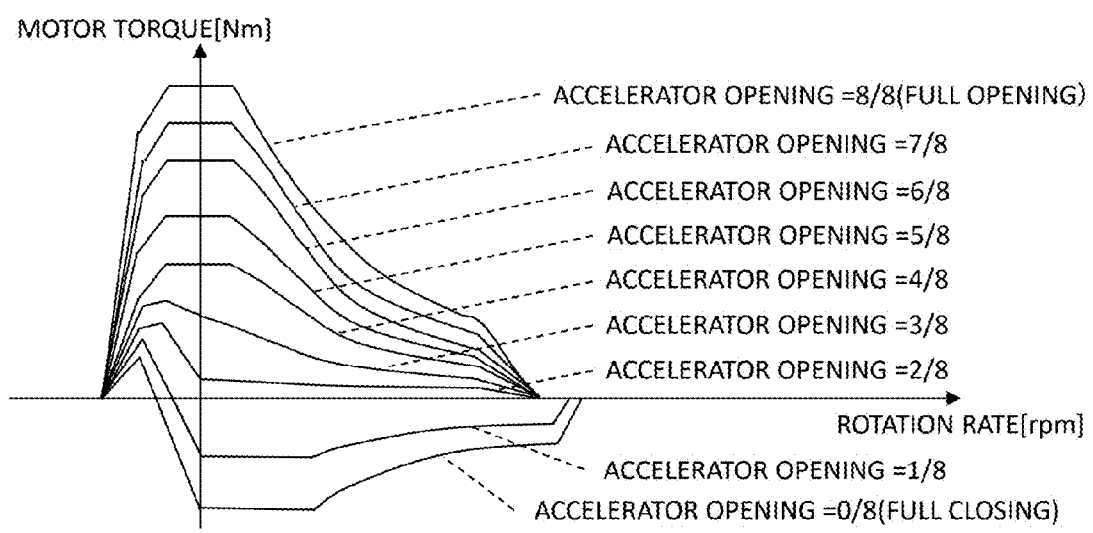
FIG. 3 is a diagram illustrating an example of an accelerator position (accelerator opening degree)-torque table.

In Step S202, a first torque target value Tm1* is set. Specifically, the first torque target value Tm1* is set on the basis of the accelerator position AP input in Step S201 and the motor rotation speed ω m by referring to an accelerator position-torque table illustrated in FIG. 3. Note that, the accelerator position-torque table is not limited to the table illustrated in FIG. 3.

In Step S203, a stop control process to control so as to stop the electric motor vehicle is performed. Specifically, whether the electric motor vehicle is just before the stop of the vehicle is determined. The first torque target value Tm1* calculated in Step S202 is set as a third torque target value Tm3* before the electric motor vehicle is just before the stop of the vehicle, and a second torque target value Tm2*, which converges to a disturbance torque estimated value Td described later, with a reduction in the motor rotation speed is set as the third torque target value Tm3* after the electric motor vehicle is just before the stop of the vehicle. Then, on the basis of the third torque target value Tm3*, the motor torque command value Tm* and the friction-braking-amount command value Tb* are calculated. The brake controller 11 generates the brake fluid pressure according to the friction-braking-amount command value Tb* to actuate the friction brake 12, thus decelerating or stopping the vehicle. The detail of the stop control process is described later.

In Step S204, a d-axis current target value id* and a q-axis current target value iq* are obtained on the basis of the motor torque command value Tm* calculated in Step S203, the motor rotation speed ωm, and the direct-current voltage value Vdc. For example, a table defining a relationship of the d-axis current target value and the q-axis current target value with the motor torque command value, the motor rotation speed, and the direct-current voltage value is prepared in advance and the d-axis current target value id* and the q-axis current target value iq* are obtained by referring to this table.

In Step S205, a current control is performed to match a d-axis current id and a q-axis current iq with the d-axis current target value id* and the q-axis current target value iq* obtained in Step S204, respectively. To this end, the d-axis current id and the q-axis current iq are first obtained on the basis of the three-phase alternating current values iu, iv and iw and the rotator phase α of the motor 4 input in Step S201. Subsequently, d-axis and q-axis voltage command values vd and vq are calculated from deviations between the d-axis and q-axis current command values id* and iq* and the d-axis and q-axis currents id and iq. It should be noted that a non-interference voltage necessary to cancel out an interference voltage between d-q orthogonal coordinate axes may be added to the calculated d-axis and q-axis voltage command values vd and vq.

Subsequently, from the d-axis and q-axis voltage command values vd and vq and the rotator phase α of the motor 4, the three-phase alternating-current voltage command values vu, vv, and vw are obtained. From the obtained three-phase alternating-current voltage command values vu, vv, and vw and the direct-current voltage value Vdc, PWM signals tu (%), tv (%), and tw (%) are obtained. By opening and closing the switching elements of the inverter 3 by the PWM signals tu, tv and tw obtained in this way, the motor 4 can be driven with a desired torque instructed by the torque command value Tm*.

Here, before the stop control process performed in Step S203 is described, a transfer characteristic Gp(s) from the motor torque Tm until the motor rotation speed ωm and a transfer characteristic Gp(s) from a friction braking amount Tb until the motor rotation speed corn in the control device for vehicle according to the embodiment are described.

Figure 4:
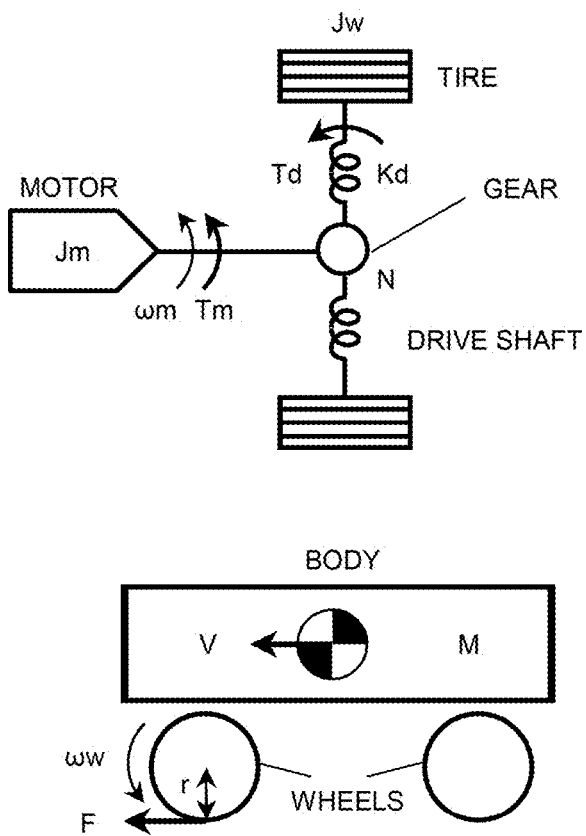
FIG. 4 is a diagram modeling a drive force transmission system of the vehicle.

FIG. 4 is a diagram modeling a drive force transmission system of the vehicle, and respective parameters in the diagram are as described below.

$J_m$: inertia of electric motor
$J_w$: inertia of drive wheels

M: weight of vehicle
$K_d$: torsional rigidity of drive system
$K_t$: coefficient relating to friction between tires and road surface
N: overall gear ratio
r: load radius of tires
$\omega_m$: angular velocity of electric motor
$T_m$: torque target value Tm*
Td: torque of drive wheels
F: force applied to vehicle
V: speed of vehicle
$\omega_w$: angular velocity of drive wheels
$T_b$: friction braking amount (motor axis conversion torque)

The following equations of motion can be derived from FIG. 4. Note that, the asterisk (*) attached to the right-upper corner of a symbol in the following Equations (1) to (3) indicates a time differential. It is defined: $T_b>0$ with $\omega_w>0$, $T_b<0$ with $\omega_w<0$, and $T_b=0$ with $\omega_w=0$.

[Equation 1]

$$J_m \cdot \omega_m^* = T_m - T_d/N \quad (1)$$

[Equation 2]

$$2J_w \cdot \omega_w^* = T_d - rF - N \cdot T_b \quad (2)$$

[Equation 3]

$$M \cdot V^* = F \quad (3)$$

[Equation 4]

$$T_d = K_d \int (\omega_m/N - \omega_w) dt \quad (4)$$

[Equation 5]

$$F = K_t (r\omega_w - V) \quad (5)$$

To obtain the transfer characteristic Gp(s) from the torque target value Tm of the motor 4 until the motor rotation speed ωm and a transfer characteristic Gb(s) from the friction braking amount Tb until the motor rotation speed ωm on the basis of the equations of motion shown in Equations (1) to (5), the transfer characteristics Gp(s) and Gb(s) are each expressed by the following Equations (6) and (7).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

[Equation 7]

$$G_b(s) = -\frac{b_1 s + b_0}{s(a_4 s^3 + a_3 s^2 + a_2 s + a_1)} \quad (7)$$

Here, each parameter in Equations (6) and (7) is expressed by the following Equation (8).

[Equation 8]

$a_4 = 2J_m J_w M$ $a_3 = J_m(2J_w + Mr^2)K_t$ $a_2 = (J_m + 2J_w/N^2)M \cdot K_d$ $a_1 = (J_m + 2J_w/N^2 + Mr^2/N^2)K_d K_t$ $b_3 = 2J_w \cdot M$ $b_2 = (2J_w + Mr^2)K_t$ $b_1 = M \cdot K_d$ $$b_0 = K_d \cdot K_t \quad (8)$$

Through examinations, the poles and 0 points of a transfer function shown in Equation (6) can be approximated to a transfer function of the following Equation (9), and one pole and one 0 points indicate values extremely close to each other. This is equivalent to that a and 13 of the following Equation (9) indicate values extremely close to each other.

[Equation 9]

$$G_p(s) = \frac{(s+\beta)(b_2' s^2 + b_1' s + b_0')}{s(s+\alpha)(a_3' s^2 + a_2' s + a_1')} \quad (9)$$

Accordingly, by performing pole-zero cancellation (approximation to α=β) in Equation (9), Gp(s) constitutes a transfer characteristic of (second order)/(third order) as shown in the following Equation (10).

[Equation 10]

$$G_p(s) = \frac{(b_2' s^2 + b_1' s + b_0')}{s(a_3' s^2 + a_2' s + a_1')} \cdot \frac{\beta}{\alpha} \quad (10)$$

Next, the detail of the stop control process performed in Step S203 of FIG. 2 is described.

Figure 5:
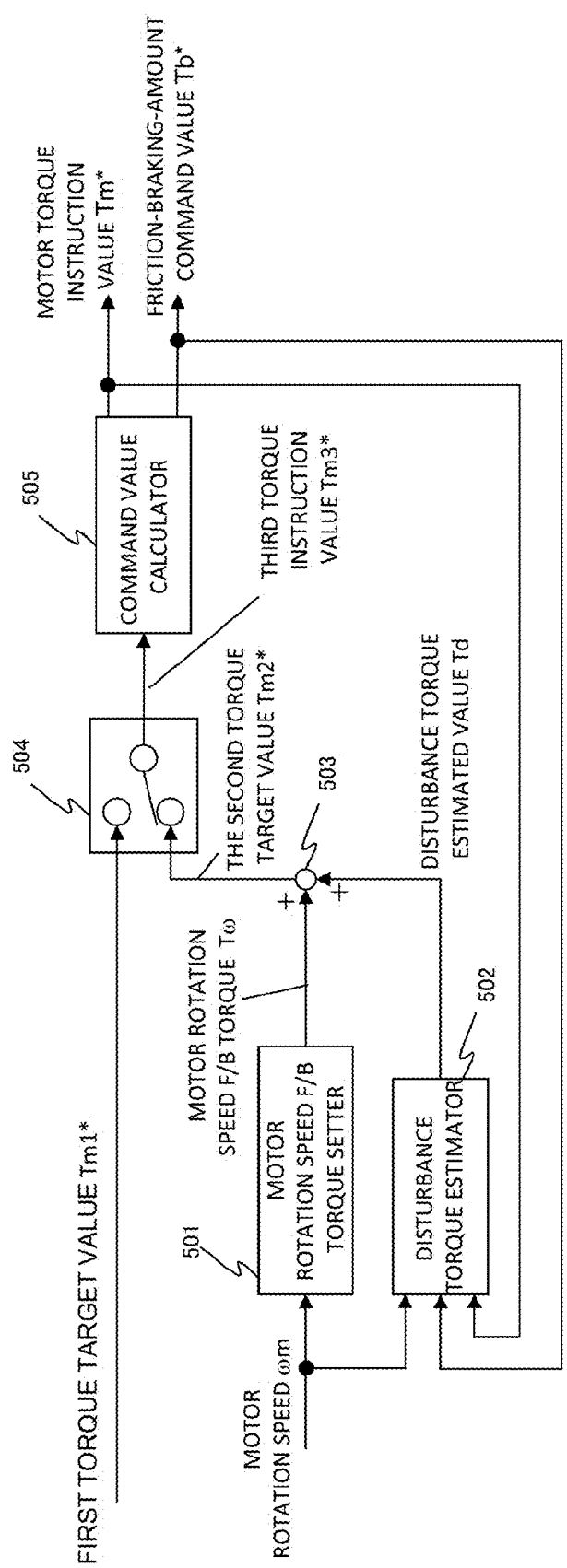
FIG. 5 is a block diagram for achieving a stop control process.

FIG. 5 is a block diagram for achieving the stop control process. A motor rotation speed F/B torque setting device 501, a disturbance torque estimator 502, an adder 503, a torque comparator 504, and a command value calculator 505 perform the stop control process.

The motor rotation speed F/B torque setting device 501 calculates a motor rotation speed feedback torque (hereinafter referred to as a motor rotation speed F/B torque) Tω on the basis of the detected motor rotation speed ωm.

Figure 6:
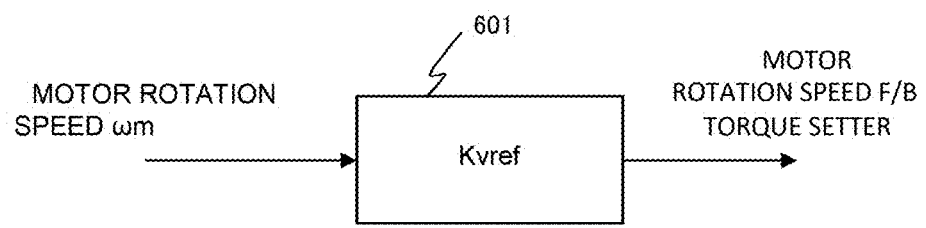
FIG. 6 is a diagram describing a method for calculating a motor rotation speed F/B torque $T\omega$ on the basis of a motor rotation speed $\omega m$.

FIG. 6 is a diagram describing a method for calculating the motor rotation speed F/B torque Tω on the basis of the motor rotation speed ωm. The motor rotation speed F/B torque setting device 501 includes a multiplier 601 and calculates the motor rotation speed F/B torque Tω by multiplying the motor rotation speed ωm by a gain Kvref. However, Kvref is a negative (minus) value necessary to stop the electric motor vehicle just before the electric motor vehicle stops, and appropriately set, for example, from experimental data or similar data. The motor rotation speed F/B torque Tω is set as a torque capable of obtaining a larger braking force as the motor rotation speed ωm increases.

It should be noted that, although the motor rotation speed F/B torque setting device 501 is described to calculate the motor rotation speed F/B torque Tω by multiplying the motor rotation speed ωm by the gain Kvref, the motor rotation speed F/B torque Tω may be calculated using, for example, a regenerative torque table defining a regenerative torque with respect to the motor rotation speed cm and an attenuation rate table storing an attenuation rate of the motor rotation speed ωm in advance.

The disturbance torque estimator 502 illustrated in FIG. 5 calculates the disturbance torque estimated value Td on the basis of the detected motor rotation speed ωm, the motor torque command value Tm*, and the friction-braking-amount command value Tb*. The command value calculator 505, which will be described later, calculates the motor torque command value Tm* and the friction-braking-amount command value Tb*.

Figure 7:
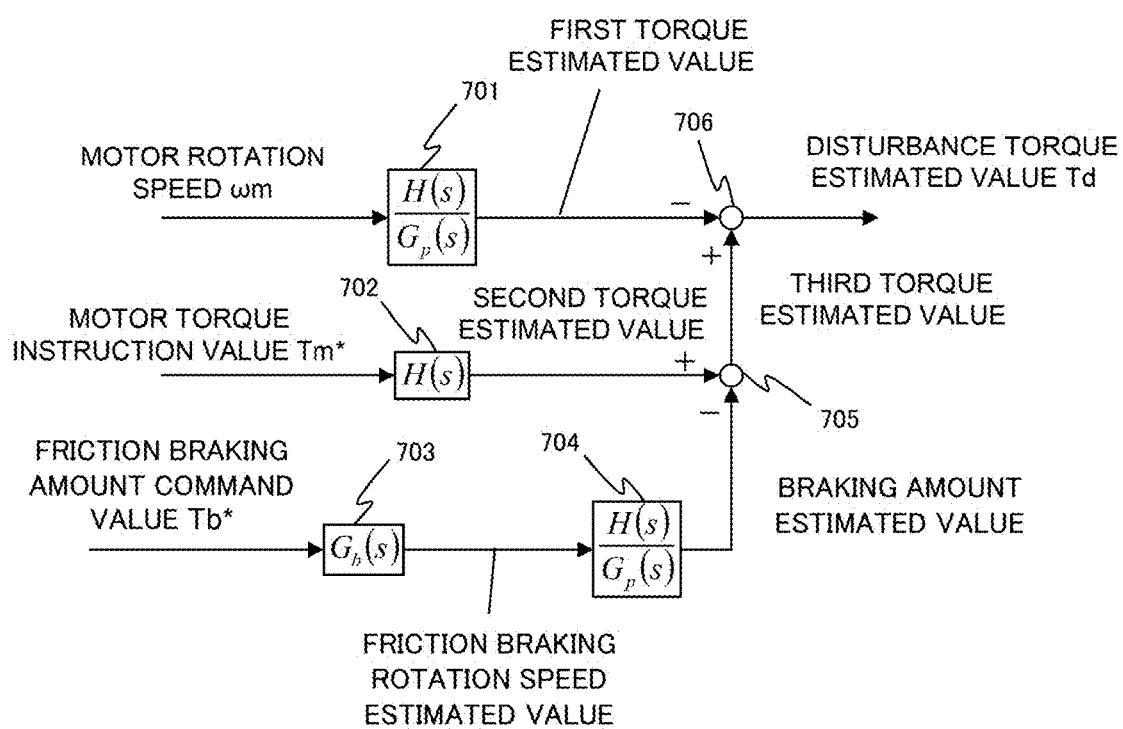
FIG. 7 is a block diagram describing a method for calculating a disturbance torque estimated value Td on the basis of the motor rotation speed $\omega m$, a motor torque command value Tm*, and a friction-braking-amount command value Tb*.

FIG. 7 is a block diagram describing a method for calculating the disturbance torque estimated value Td on the basis of the motor rotation speed cam, the motor torque command value Tm*, and the friction-braking-amount command value Tb*. The disturbance torque estimator 502 includes a control block 701, a control block 702, a control block 703, a control block 704, a subtractor 705, and a subtractor 706.

The control block 701 functions as a filter having a transfer characteristic H(s)/Gp(s) and inputs the motor rotation speed ωm and performs a filtering process, thus calculating a first motor torque estimated value. H(s) is a low-pass filter having such a transfer characteristic that a difference between the denominator degree and the numerator degree is equal to or more than a difference between the denominator degree and the numerator degree of the model Gp(s) (see Equation (10)).

The control block 702 functions as a low-pass filter having a transfer characteristic H(s) and inputs the motor torque command value Tm* and performs the filtering process, thus calculating a second motor torque estimated value.

The control block 703 functions as a filter having the transfer characteristic Gb(s) shown in Equation (7) and inputs the friction-braking-amount command value Tb* and performs the filtering process, thus calculating a friction braking rotation speed estimated value. It should be noted that, instead of the friction-braking-amount command value Tb*, a friction braking amount calculated on the basis of the brake fluid pressure detected by the fluid pressure sensor 10 may be used.

The control block 704 functions as a filter having a transfer characteristic H(s)/Gp(s) similar to the control block 701 and inputs the friction braking rotation speed estimated value and performs the filtering process, thus calculating an amount-of-friction braking estimated value.

The subtractor 705 subtracts the amount-of-friction braking estimated value from the second motor torque estimated value to calculate a third motor torque estimated value.

The subtractor 706 subtracts the first motor torque estimated value from the third motor torque estimated value to calculate the disturbance torque estimated value Td. This disturbance torque estimated value Td is a value excluding the friction braking amount.

It should be noted that although the disturbance torque according the embodiment is estimated by a disturbance observer as illustrated in FIG. 7, it may be estimated using a meter such as a vehicle longitudinal G sensor.

Here, while an air resistance, a modeling error caused by a variation of the vehicle weight due to the number of passengers and load capacity, a rolling resistance of the tires, a gradient resistance of the road surface, and a similar resistance are thought as the disturbances, a disturbance factor dominant just before the stop of the vehicle is the gradient resistance. While the disturbance factors differ depending on driving conditions, the disturbance factors described above can be collectively estimated since the disturbance torque estimator 502 calculates the disturbance torque estimated value Td on the basis of the motor torque command value Tm*, the motor rotation speed ωm, the vehicle model Gp(s), and the friction-braking-amount command value Tb*. This achieves a smooth vehicle stop from deceleration under any driving condition.

Returning to FIG. 5, the explanation will be continued. The adder 503 adds the motor rotation speed F/B torque Tω calculated by the motor rotation speed F/B torque setting device 501 and the disturbance torque estimated value Td calculated by the disturbance torque estimator 502 to calculate the second torque target value Tm2*. When the motor rotation speed ωm decreases and approaches 0, the motor rotation speed F/B torque Tω also approaches 0. Accordingly, the second torque target value Tm2* converges to the disturbance torque estimated value Td according to the reduction in the motor rotation speed ωm.

The torque comparator 504 compares the magnitudes of the first torque target value Tm1* with the second torque target value Tm2* and sets the larger torque target value as the third torque target value Tm3*. The second torque target value Tm2* is smaller than the first torque target value Tm1* during the travel of the vehicle. When the vehicle decelerates and reaches just before the stop of the vehicle (the vehicle speed is equal to or less than a predetermined vehicle speed), the second torque target value Tm2* becomes larger than the first torque target value Tm1*. Thus, when the first torque target value Tm1* is larger than the second torque target value Tm2*, the torque comparator 504 determines that the vehicle is prior to just before the stop of the vehicle and sets the third torque target value Tm3* to the first torque target value Tm1*. Further, when the second torque target value Tm2* becomes larger than the first torque target value Tm1*, the torque comparator 504 determines that the vehicle is just before the stop of the vehicle and switches the third torque target value Tm3* from the first torque target value Tm1* to the second torque target value Tm2*.

The command value calculator 505 calculates the motor torque command value Tm* and the friction-braking-amount command value Tb* on the basis of the third torque target value Tm3* output from the torque comparator 504. Here, under the condition where the motor 4 performs the regenerative operation, it is defined: Tb*=|Tm3*| with Tm*=0 and $\omega_w>0$, Tb*=0 with $\omega_w=0$, and Tb*=−|Tm3*| with $\omega_w<0$. Under the condition where the motor 4 performs a power running operation, it is defined: Tm*=Tm3* and Tb*=0. Under the condition where the motor 4 performs the power running operation means a situation where the vehicle travels by the drive force from the motor 4 and a situation where the vehicle is stopped on the uphill road.

Figure 8A:
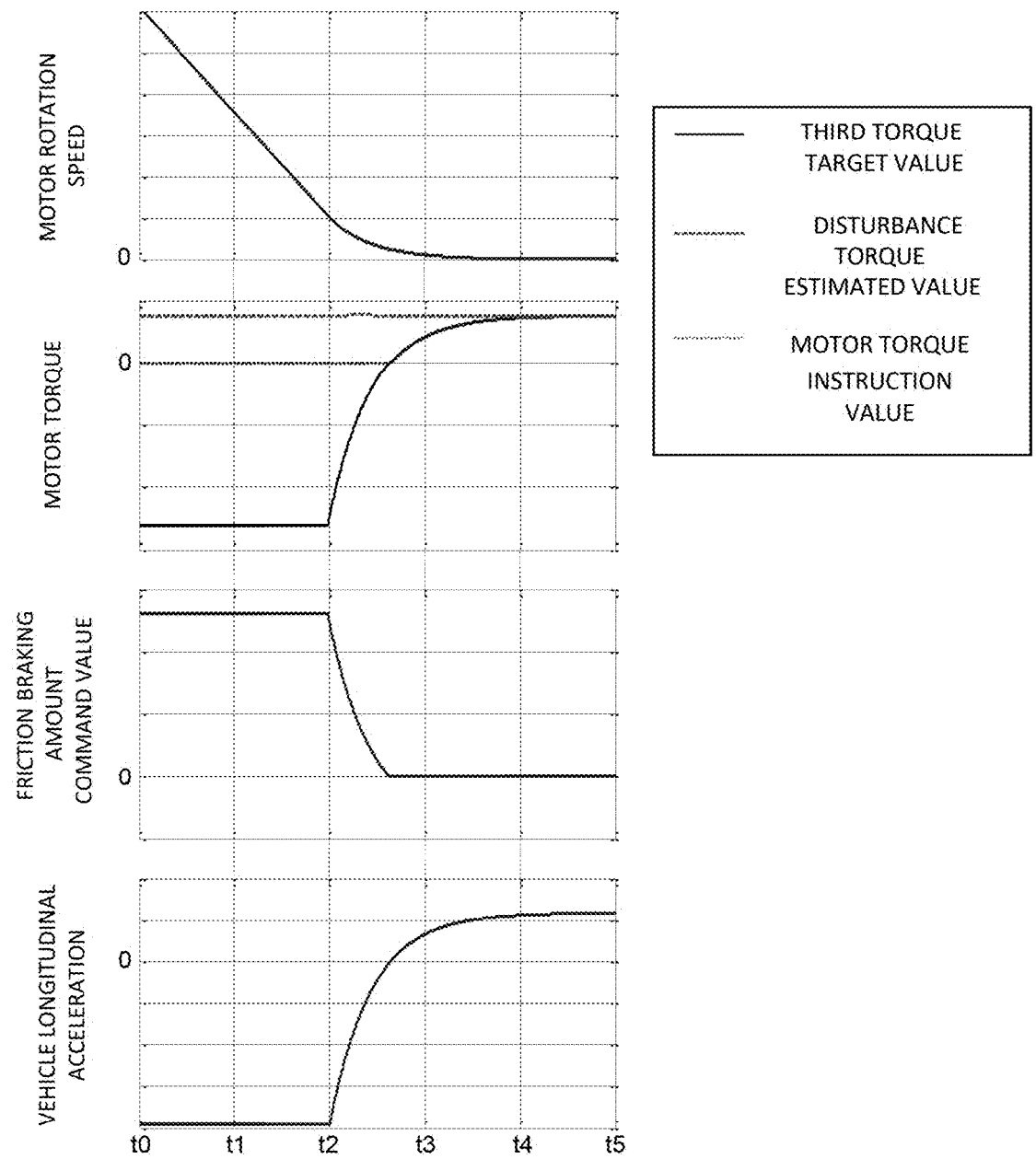
FIG. 8A are diagrams illustrating control results in the case where the control device for vehicle of the one embodiment performs a stop control process on an uphill road.
Figure 8B:
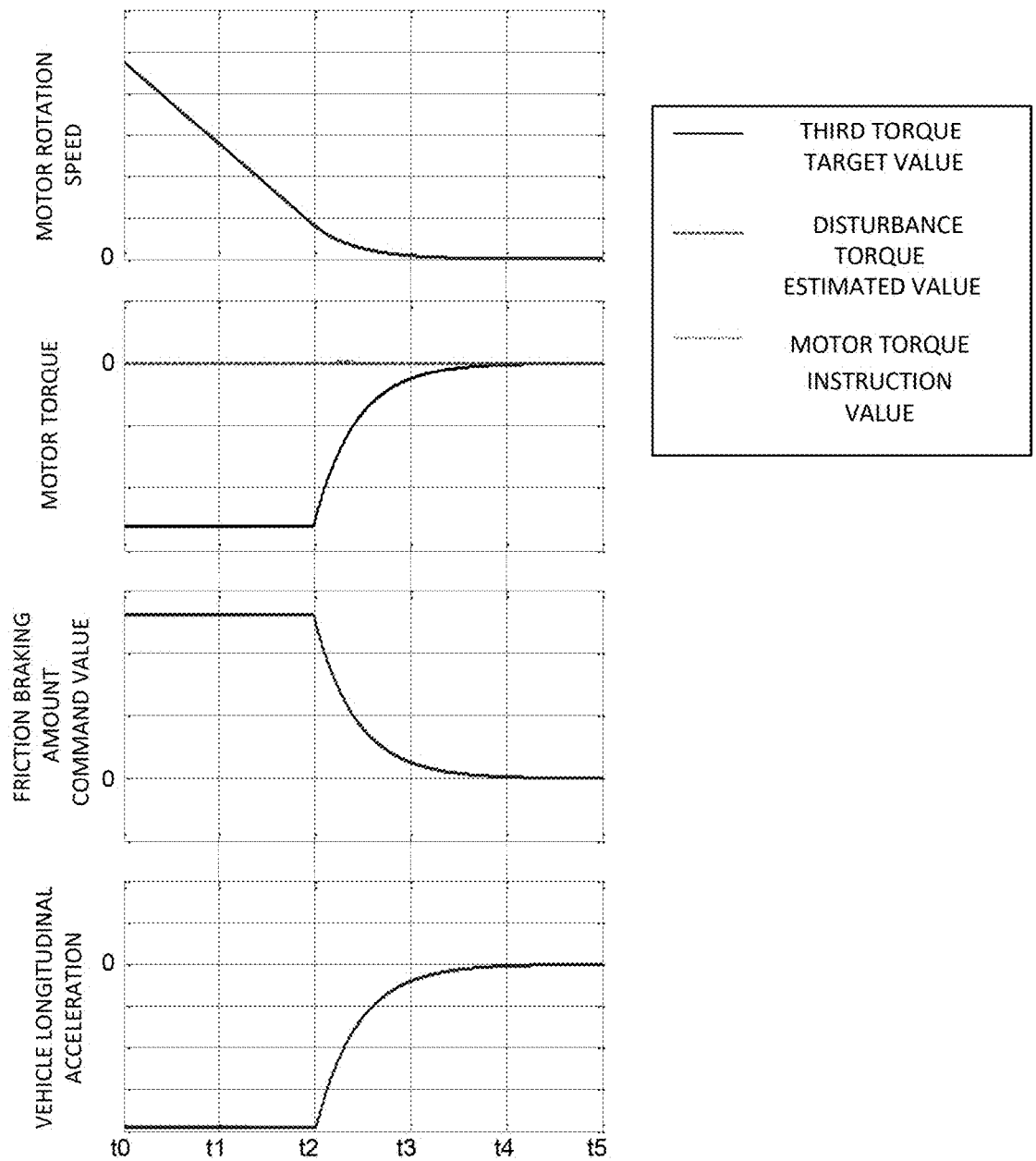
FIG. 8B are diagrams illustrating control results in the case where the control device for vehicle of the one embodiment performs the stop control process on a flat road.
Figure 8C:
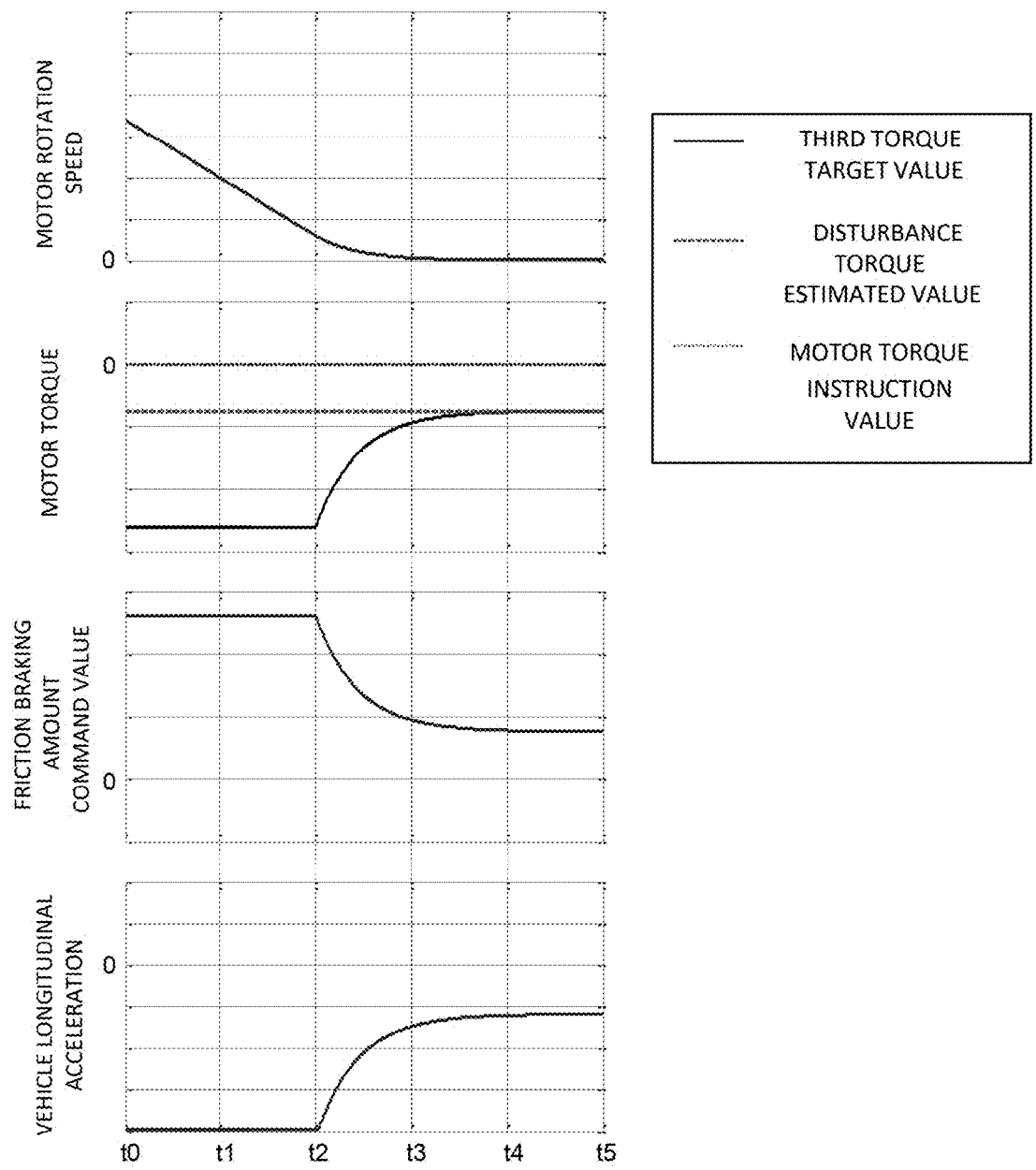
FIG. 8C are diagrams illustrating control results in the case where the control device for vehicle of the one embodiment performs the stop control process on a downhill road.

FIG. 8A to FIG. 8C are diagrams illustrating control results in the case where the control device for vehicle of the one embodiment performs the stop control process. FIG. 8A to FIG. 8C are the control results when the vehicle stops on the respective uphill road, flat road, and downhill road. The respective drawings express the motor rotation speed, the motor torque, the friction-braking-amount command value, and the vehicle longitudinal acceleration in the order from the above.

First, the following describes the control result when the vehicle stops on the uphill road with reference to FIG. 8A. A time before a time t2 is prior to the vehicle being just before the stop at which the first torque target value Tm1* is larger than the second torque target value Tm2*.

At a time ti at which the vehicle is prior to just before the stop, the first torque target value Tm1* calculated in Step S202 in FIG. 2 is set to the third torque target value Tm3*. The vehicle decelerates according to the friction-braking-amount command value Tb* decided on the basis of the first torque target value Tm1* (=third torque target value Tm3*).

At the time t2, when the second torque target value Tm2* is larger than the first torque target value Tm1* and it is determined that the vehicle is just before the stop, the third torque target value Tm3* switches from the first torque target value Tm1* to the second torque target value Tm2*. Accordingly, the friction-braking-amount command value Tb* also switches from the value decided on the basis of the first torque target value Tm1* to the value decided on the basis of the second torque target value Tm2*. At the time t2 or after the time t2, the second torque target value Tm2* (=third torque target value Tm3*) converges to the disturbance torque estimated value Td according to the reduction in the motor rotation speed ωm.

The third torque target value Tm3* converging to the disturbance torque estimated value Td switches from a negative value to a positive value between the times t2 and t3. At a point where the third torque target value Tm3* switches from the negative value to the positive value, the friction-braking-amount command value Tb* becomes 0, and a deceleration adjustment by the power running operation of the motor 4 starts. The motor torque command value Tm* having 0 until the third torque target value Tm3* switches from the negative value to the positive value afterward matches the third torque target value Tm3* and converges to the disturbance torque estimated value Td.

At a time t5, the motor torque command value Tm* (=Tm3*=Tm2*) converges to the disturbance torque estimated value Td and the motor rotation speed ωm asymptotically converges to 0. This achieves the smooth vehicle stop without acceleration vibration in the longitudinal direction. When the motor torque command value Tm* matches the disturbance torque estimated value Td, the vehicle stop state is maintained on the uphill road as well at the time t5 and after the time t5.

It should be noted that, the above-described explanation describes that the friction-braking-amount command value Tb* becomes 0 at the point where the third torque target value Tm3* switches from the negative value to the positive value, and the deceleration adjustment by the power running operation by the motor 4 starts. However, the vehicle may be stopped using the friction brake 12 without starting the power running operation by the motor 4 and the stop state may be maintained. Even if the friction-braking-amount command value Tb* becomes 0 at the point where the third torque target value Tm3* switches from the negative value to the positive value, and the deceleration adjustment by the power running operation by the motor 4 starts, the friction brake 12 may be actuated at the vehicle speed being approximately 0 to maintain the stop state. To actuate the friction brake 12 to maintain the stop state, the friction-braking-amount command value Tb* is set to a value decided on the basis of the disturbance torque estimated value Td at the vehicle speed of approximately 0.

Subsequently, the following describes the control result when the vehicle stops on the flat road with reference to FIG. 8B. The disturbance torque estimated value Td on the flat road is set to 0.

At the time t1 at which the vehicle is prior to just before the stop, the first torque target value Tm1* calculated in Step S202 in FIG. 2 is set to the third torque target value Tm3*. The vehicle decelerates according to the friction-braking-amount command value Tb* decided on the basis of the first torque target value Tm1* (=third torque target value Tm3*).

At the time t2, when the second torque target value Tm2* is larger than the first torque target value Tm1* and it is determined that the vehicle is just before the stop, the third torque target value Tm3* switches from the first torque target value Tm1* to the second torque target value Tm2*. Accordingly, the friction-braking-amount command value Tb* also switches from the value decided on the basis of the first torque target value Tm1* to the value decided on the basis of the second torque target value Tm2*.

From the times t2 to t5, the second torque target value Tm2* asymptotically converges to 0 (disturbance torque estimated value Td) according to the reduction in the motor rotation speed ωm. This also causes the third torque target value Tm3* to asymptotically converge to 0. Therefore, the friction-braking-amount command value Tb* also asymptotically converges to 0 (disturbance torque estimated value Td) and the motor rotation speed ωm also asymptotically converges to 0. This achieves the smooth vehicle stop without the acceleration vibration in the longitudinal direction. At the time t5 and after the time t5, the vehicle stop state is maintained.

Finally, the following describes the control result when the vehicle stops on the downhill road with reference to FIG. 8C. At the time t1 at which the vehicle is prior to just before the stop, the first torque target value Tm1* calculated in Step S202 in FIG. 2 is set to the third torque target value Tm3*. The vehicle decelerates according to the friction-braking-amount command value Tb* decided on the basis of the first torque target value Tm1* (=third torque target value Tm3*).

At the time t2, when the second torque target value Tm2* is larger than the first torque target value Tm1* and it is determined that the vehicle is just before the stop, the third torque target value Tm3* switches from the first torque target value Tm1* to the second torque target value Tm2*. Accordingly, the friction-braking-amount command value Tb* also switches from the value decided on the basis of the first torque target value Tm1* to the value decided on the basis of the second torque target value Tm2*. At the time t2 or after the time t2, the second torque target value Tm2* (=third torque target value Tm3*) converges to the disturbance torque estimated value Td according to the reduction in the motor rotation speed ωm.

At the time t5, the friction-braking-amount command value Tb* converges to the value decided on the basis of the disturbance torque estimated value Td and the motor rotation speed ωm asymptotically converges to 0. This achieves the smooth vehicle stop without the acceleration vibration in the longitudinal direction. Since the friction-braking-amount command value Tb* converges to the value decided on the basis of the disturbance torque estimated value Td, the vehicle stop state is maintained by the friction brake 12 on the downhill road as well after the time t5.

The above-described control device for vehicle of the one embodiment is the device that generates the friction braking force to decelerate the vehicle. The control device for vehicle estimates the disturbance torque acting on the vehicle. When the accelerator operation amount is equal to or less than the predetermined value and the vehicle is just before the stop of the vehicle, the control device for vehicle causes the friction braking amount to converge to the friction braking amount to the value decided on the basis of the disturbance torque estimated value Td in conjunction with the reduction in the motor rotation speed (speed parameter) proportionate to the traveling speed of the vehicle. This achieves the smooth deceleration without the acceleration vibration in the longitudinal direction just before the stop of the vehicle regardless of the flat road, the uphill road, and the downhill road and additionally ensures maintaining the vehicle stop state. The deceleration or the stop of the vehicle is achieved by the actuation of the friction brake 12 through the command from the motor controller 2 and the brake controller 11. This eliminates the need for switchingly depressing the accelerator pedal and the brake pedal by the driver, ensuring reducing the load applied to the driver.

It should be noted that, the accelerator operation amount is equal to or less than the predetermined value intends the accelerator operation amount when the vehicle sufficiently travels at a low speed, for example, a speed of 15 km/h or less. It should be noted that, needless to say, the exemplary vehicle speed is one example.

Currently, studies on a vehicle that can control the acceleration and deceleration and the stop of the vehicle only the accelerator pedal operation have advanced. In this vehicle, reducing or zeroing a depression amount of the accelerator pedal depressed by the driver allows the vehicle to stop by the regenerative braking force from the motor. However, for example, in the case where an SOC of a battery is high such as the case where the battery is fully charged, this vehicle restricts the motor regeneration amount. In such case, the vehicle cannot be decelerated and stopped using the regenerative braking force from the motor. However, the control device for vehicle according to the embodiment can actuate the friction brake 12 by the command from the controller to decelerate and stop the vehicle. Accordingly, even with the battery 1 in the high SOC state, the vehicle can be smoothly decelerated and stopped.

The control device for vehicle of the one embodiment multiplies the motor rotation speed ωm by the predetermined gain Kvref to calculate the motor rotation speed F/B torque Tω. The control device for vehicle decides the friction braking amount on the basis of the calculated motor rotation speed F/B torque Tω) and the disturbance torque estimated value Td. The motor rotation speed F/B torque Tω, which is calculated by the multiplication of the motor rotation speed ωm by the predetermined gain Kvref, works as a viscosity (damper) element with respect to dynamic characteristics from the motor torque until the motor rotation speed. Accordingly, the motor rotation speed ωm asymptotically and smoothly converges to 0 just before the stop of the vehicle. This achieves the smooth vehicle stop without a shock in the longitudinal acceleration.

The control device for vehicle of the one embodiment estimates the disturbance torque on the basis of the model Gp(s) for the transfer characteristic of the motor rotation speed with respect to the torque input to the vehicle and the friction braking amount. The estimation of the disturbance torque on the basis of the model Gp(s) can accurately estimate the disturbance torque or estimates the disturbance torque taking the friction braking amount into consideration, thereby ensuring the estimation of the disturbance torque excluding the friction braking amount acting on the vehicle.

As the friction braking amount used by the disturbance torque estimator 502 to estimate the disturbance torque, the friction braking amount calculated on the basis of the brake fluid pressure detected by the fluid pressure sensor 10 can be used. This allows accurately estimating the disturbance torque excluding the friction braking amount taking the actual friction braking amount acting on the vehicle into consideration.

By the use of the friction-braking-amount command value as the friction braking amount used by the disturbance torque estimator 502 to estimate the disturbance torque, an influence from a detection delay time of the sensor is not given compared with the case of the detection of the friction braking amount using the sensor such as the fluid pressure sensor 10. This allows accurately estimating the disturbance torque excluding the friction braking amount.

With the control device for vehicle of the one embodiment, the disturbance torque estimator 502 calculates the disturbance torque estimated value Td on the basis of the model Gp(s) for the transfer characteristic of the motor rotation speed with respect to the torque input to the vehicle, the model Gb(s) for the transfer characteristic of the motor rotation speed with respect to the friction braking amount input to the vehicle, and the friction braking amount. Taking the response from the friction-braking-amount command value until the generation of the brake fluid pressure and the response from the generation of the brake fluid pressure until the braking force acts on the wheel via the brake pad into consideration ensures reducing the difference between the vehicle model and the actual response of the vehicle.

The control device for vehicle of the one embodiment calculates the first torque target value Tm1* on the basis of vehicle information and calculates the second torque target value Tm2* converged to the disturbance torque estimated value in conjunction with the reduction in the motor rotation speed ωm. The comparison of the magnitudes of the first torque target value with the second torque target value determines whether the vehicle is just before the stop. When the control device for vehicle determines that the vehicle is not just before the stop, the control device for vehicle decides the friction braking amount on the basis of the first torque target value Tm1*. When the control device for vehicle determines that the vehicle is just before the stop, the control device for vehicle decides the friction braking amount on the basis of the second torque target value Tm2*. This allows switching without discontinuity when the friction braking amount is switched from the value on the basis of the first torque target value Tm1* to the value on the basis of the second torque target value Tm2* just before the stop of the vehicle. Since the friction braking amount is decided on the basis of the larger value among the first torque target value Tm1* and the second torque target value Tm2*, torque discontinuity does not occur in any gradient, thereby achieving the smooth deceleration.

Furthermore, when the accelerator operation amount is equal to or less than the predetermined value and the vehicle is just before the stop on the uphill road, the motor torque command value Tm* is converged to the disturbance torque estimated value Td in conjunction with the reduction in the motor rotation speed ωm. Therefore, the smooth vehicle stop from the deceleration is achieved even on uphill roads, thereby ensuring maintaining the vehicle stop state.

The present invention is not limited to the above-described one embodiment. For example, the above-described embodiment describes the example of the application of the control device for vehicle to the electric vehicle. However, since the control device for vehicle of the present invention is applicable to the vehicle that can electrically adjust the friction braking amount, the application target is not limited to the electric motor vehicle with the motor as the driving source.

The above-described explanation describes that, when the accelerator operation amount is equal to or less than the predetermined value and the vehicle is just before the stop, the friction braking amount converges to the disturbance torque estimated value Td in conjunction with the reduction in the motor rotation speed ωm. However, since the speed parameters such as the wheel speed, the vehicle body speed, and the rotation speed of the drive shaft are proportional relationship with the rotation speed of the electric motor 4, the friction braking amount may be converged to the disturbance torque estimated value Td in conjunction with the reduction in speed parameter, which is proportionate to the rotation speed of the motor 4.

The invention claimed is:

1. A control device for vehicle that generates a friction braking force, via friction brakes, to decelerate a vehicle, the control device for vehicle comprising:
   a vehicle speed sensor configured to detect a speed parameter proportionate to a traveling speed of the vehicle;

an accelerator position sensor configured to detect an accelerator operation amount; and a controller configured to control the friction brakes; and wherein the controller is further configured to:

estimate a disturbance torque acting on the vehicle based on disturbance factors;

electrically adjust a friction braking amount; and control the friction braking amount to converge to a value decided on a basis of the disturbance torque in conjunction with a reduction in the speed parameter when the accelerator operation amount is equal to or less than a predetermined value and the vehicle is just before a stop of the vehicle.

2. The control device for vehicle according to claim 1, wherein the controller is further configured to:

multiply the speed parameter by a predetermined gain to calculate a speed feedback torque, wherein the controller is further configured to decide the friction braking amount on a basis of the speed feedback torque and the disturbance torque.

3. The control device for vehicle according to claim 1, wherein the controller is further configured to estimate the disturbance torque on a basis of a model for a transfer characteristic of the speed parameter with respect to a torque input to the vehicle and the friction braking amount.

4. The control device for vehicle according to claim 3, wherein the controller is further configured to:

detect a friction-braking-amount-related value related to the friction braking amount, wherein the friction braking amount is used by the controller to estimate the disturbance torque, the friction braking amount being calculated on a basis of the friction-braking-amount-related value detected by the controller.

5. The control device for vehicle according to claim 3, wherein the friction braking amount used by the controller to estimate the disturbance torque is a friction-braking-amount command value.

6. The control device for vehicle according to claim 3, wherein the controller is configured to estimate the disturbance torque on a basis of a model for a transfer characteristic of the speed parameter with respect to the torque input to the vehicle, a model for a transfer characteristic of the speed parameter with respect to an input of the friction braking amount to the vehicle, and the friction braking amount.

7. The control device for vehicle according to claim 1, wherein the controller is further configured to:

calculate a first torque target value on a basis of vehicle information;

calculate a second torque target value, the second torque target value converging to the disturbance torque in conjunction with the reduction in the speed parameter; and compare a magnitude of the first torque target value with a magnitude of the second torque target value to determine whether the vehicle is just before the stop of the vehicle, wherein the controller is configured to decide the friction braking amount on a basis of the first torque target value when the vehicle is determined as not being just before the stop of the vehicle, and the controller is configured to decide the friction braking amount on a basis of the second torque target value when the vehicle is determined as being just before the stop of the vehicle.

8. The control device for vehicle according to claim 1, wherein the speed parameter is a rotation speed of an electric motor.

9. The control device for vehicle according to claim 8, wherein the controller is further configured to cause a torque from the electric motor to converge to the disturbance torque in conjunction with a reduction in the rotation speed of the electric motor when the accelerator operation amount is equal to or less than a predetermined value and the vehicle is just before the stop of the vehicle on an uphill road.

10. A control method for vehicle that generates a friction braking force, via friction brakes, to decelerate a vehicle, the control method for vehicle comprising:

detecting a speed parameter proportionate to a traveling speed of the vehicle;

detecting an accelerator operation amount;

estimating, via a controller, a disturbance torque acting on the vehicle based on disturbance factors; and controlling, via the controller, a friction braking amount, to control the friction brakes, to converge to the disturbance torque in conjunction with a reduction in the speed parameter when the accelerator operation amount is equal to or less than a predetermined value and the vehicle is just before a stop of the vehicle.

* * * * *